J. H. COURNYER.
CREAM REMOVER.
APPLICATION FILED JAN. 3, 1919. RENEWED MAR. 4, 1920.
1,355,539.
Patented Oct. 12, 1920.
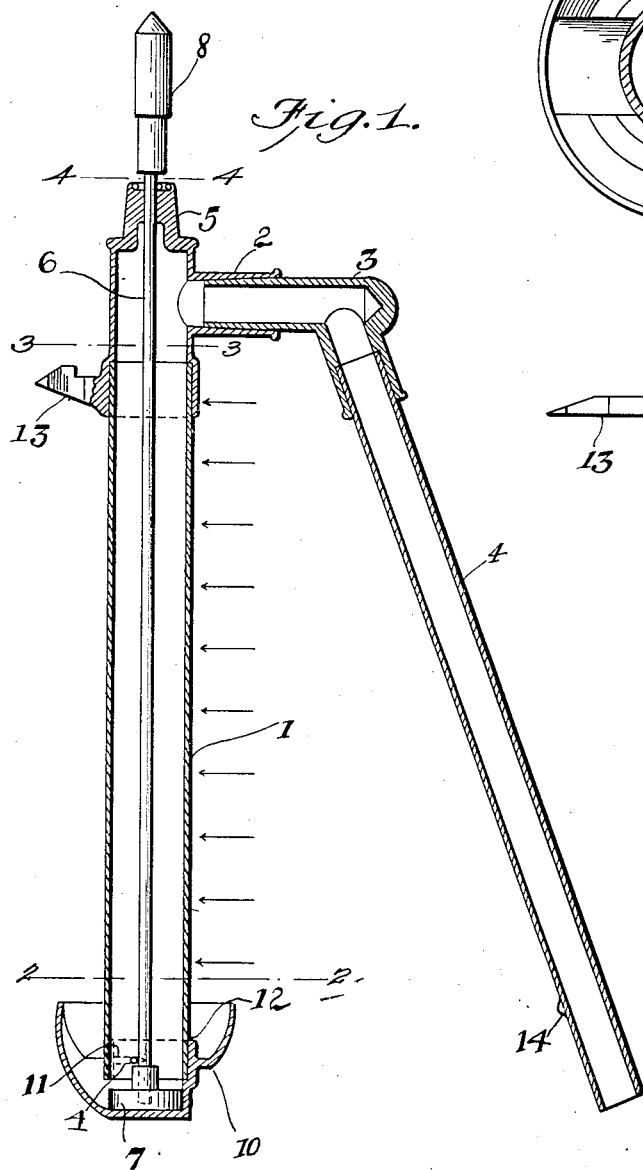
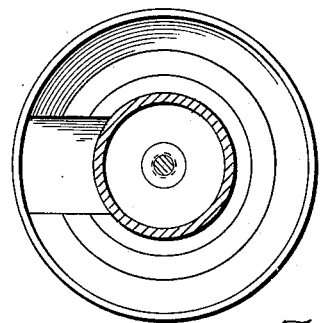
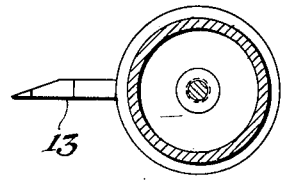
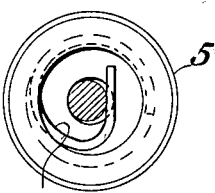
INVENTOR
J.H. Cournyer
BY
ATTORNEYS

UNITED STATES PATENT OFFICE.

JAMES HERBERT COURNYER, OF OSKALOOSA, IOWA.

CREAM-REMOVER.

1,355,539.  Specification of Letters Patent.  Patented Oct. 12, 1920.

Application filed January 3, 1919, Serial No. 269,516. Renewed March 4, 1920. Serial No. 363,289.

*To all whom it may concern:*

Be it known that I, JAMES HERBERT COURNYER, a citizen of the United States, and a resident of Oskaloosa, in the county of Mahaska and State of Iowa, have invented certain new and useful Improvements in Cream-Removers, of which the following is a specification.

My invention is an improvement in cream removers, and has for its object to provide a device of the character specified of simple construction but capable of effective results, and adapted to obviate certain unnecessary complicated parts of the construction of my Patent #1,280,965 patented October 8, 1918.

In the drawings:—

Figure 1 is a vertical section through the improved remover,

Figs. 2, 3, and 4 are sections on the lines 2—2, 3—3, and 4—4, respectively of Fig. 1.

In the present embodiment of the invention, there is an intake tube 1 which is adapted to be inserted in the vessel containing the milk, and which has near its upper end a lateral nipple 2, the bore of the nipple flaring. An elbow 3 has one of its ends engaged with this nipple, the said end being tapering to fit the flaring bore, and an outlet tube 4 is connected with the other arm of the elbow.

The upper end of tube 1 is closed by a top 5, which has a central opening, through which extends a stem 6 of a plunger 7; said stem being of such length that plunger 7 may pass out at the lower end of tube 1 before the handle 8 engages the top 5. The function of plunger 7 is to start siphon action by pulling it quickly to the top when tube 1 is inserted in cream. It is also used to clean tube 1 by pulling it back and forth.

A spring 9 is arranged within an undercut recess in the top 5, and one end of this spring is bent to extend transversely of the opening through the top and to engage the stem, and press the same laterally, to prevent accidental displacement of the stem and to prevent rattling.

A cup 10 is connected with the lower end of the inlet tube, the said cup preventing the pulling of milk below the cream line. That is, the cup shields the lower end of the tube but has its bottom spaced below the lower end of the tube, and far enough below to receive the plunger 7 and leave a clear space between the plunger and the end of the tube.

The cup has a groove 11 on that portion 12 which fits closely about the tube, and the tube 1 has a pin for engaging the groove to lock the cup to the tube. By drawing the plunger through the tube 1, it may be cleaned from end to end, and the spring 9 prevents displacement or rattling of the plunger when not in use. Preferably the tube 1 is graduated, and at the appropriate graduations, legends are placed indicating the amount of cream which would be removed when the tube 1 is inserted at any one of these levels, as for instance, 1 oz., 2 oz., etc.

It will be noticed that the upper end of the tube 1 fits within an enlargement in the lower end of the top 5, and that the nipple 2 extends from that portion of the top which forms a continuation of the tube. At the enlargement a spur 13 extends laterally from the top, the said spur being adapted to remove the bottle covers from milk bottles in order to permit the insertion of the tube 1.

It will also be noticed that the handle 8 on the upper end of the stem 6 is of such diameter that when the elbow 3 is disconnected from the nipple 2, said handle may be used to clean both the short end of the elbow and tube 4. It will be further noticed that the lower end of the tube 4 can be used to clean the nipple 2.

It will also be noticed that the tube 4 has a projection 14 which is placed at the level of the upper edge of the cup 10. This projection acts as a guide in adjusting the top of the cup to the cream line.

In operation the tube 1 is introduced within the cream, and plunger 7 lowered to rest upon the bottom of the cup 10. The cream finds its way through the opening in the cup to the external height of cream, so that when the plunger 7 is raised, not only is a column of cream drawn upwardly following the plunger, but the cream already within the tube 1 is lifted in a column and forced into elbow 3 and tube 4 so as to effectively start siphon action.

I claim:—

A siphon cream remover comprising intake and outlet tubes, a cup detachably connected with the intake tube, said cup having an internal groove and the intake having a pin for engaging the groove to lock the cup to the tube, said cup constraining the cream to flow into the cup from above, a cleaning plunger movable through the intake tube, the bottom of the cup being spaced far enough below the bottom of the intake to receive the plunger and permit the entrance of cream when the plunger is in lowermost position.

JAMES HERBERT COURNYER.

Witnesses:
 IRVING JOHNSON,
 IDA STENAGE.